United States Patent
Yadav et al.

(10) Patent No.: US 10,127,824 B2
(45) Date of Patent: Nov. 13, 2018

(54) SYSTEM AND METHODS TO CREATE MULTI-FACETED INDEX INSTRUCTIONAL VIDEOS

(71) Applicant: YEN4KEN, INC., Princeton, NJ (US)

(72) Inventors: Kuldeep Yadav, Haryana (IN); Arijit Biswas, Kolkata (IN); Ankit Gandhi, Raipur (IN); Sumit Negi, Bangalore (IN); Om D. Deshmukh, Bangalore (IN)

(*) Notice: Subject to any disclaimer, the term of this patent is extended or adjusted under 35 U.S.C. 154(b) by 94 days.

(21) Appl. No.: 15/088,508

(22) Filed: Apr. 1, 2016

(65) Prior Publication Data

US 2017/0287346 A1    Oct. 5, 2017

(51) Int. Cl.

| | |
|---|---|
| G09B 5/06 | (2006.01) |
| G11B 27/28 | (2006.01) |
| G11B 27/34 | (2006.01) |
| G06K 9/46 | (2006.01) |
| G06K 9/62 | (2006.01) |
| G06K 9/18 | (2006.01) |
| G09B 5/08 | (2006.01) |
| G11B 27/10 | (2006.01) |

(52) U.S. Cl.
CPC .............. G09B 5/065 (2013.01); G06K 9/18 (2013.01); G06K 9/46 (2013.01); G06K 9/6217 (2013.01); G09B 5/08 (2013.01); G11B 27/105 (2013.01); G11B 27/28 (2013.01); G11B 27/34 (2013.01)

(58) Field of Classification Search
CPC .......... G06K 9/18; G06K 9/46; G06K 9/6217; G09B 5/08; G10L 15/22; G11B 27/031; G11B 27/28; G11B 27/34

USPC ........ 386/241, 240, 243; 382/218, 224, 165, 382/305, 170; 715/723; 707/728, 741, 707/737; 704/251; 434/309; 1/1
See application file for complete search history.

(56) References Cited

U.S. PATENT DOCUMENTS

| | | | | |
|---|---|---|---|---|
| 5,136,655 | A * | 8/1992 | Bronson | G06F 17/30796 704/270 |
| 6,424,746 | B1 | 7/2002 | Nishida | |
| 6,578,040 | B1 * | 6/2003 | Syeda-Mahmood | G06F 17/30787 |
| 8,984,406 | B2 * | 3/2015 | Pueyo | H04N 21/21 715/230 |

(Continued)

OTHER PUBLICATIONS

Liew et al., "Slide image retrieval: a preliminary study", Proc. ACM/IEEE-CS Joint Conference on Digital Libraries JCDL, 2008.*

(Continued)

*Primary Examiner* — Thai Q Tran
*Assistant Examiner* — Stephen R Smith
(74) *Attorney, Agent, or Firm* — LeonardPatel PC (57) ABSTRACT

Features are extracted from visual and audio modalities of a video to infer the location of figures/tables/equations/graphs/flow-charts determined as video anchor points which are highlighted on the video timeline to enable quick navigation and provide a quick summary of the video.
A voice-based mechanism navigates to a point-of-interest in the video.
In case of bandwidth-constrained settings, videos are often played at a very low resolution (quality), and often users need to increase video resolution manually to understand content presented in the figures. Using the automatic identification of these aforementioned anchored points, the resolution can be changed dynamically during streaming a video, which will provide a better viewing experience.

20 Claims, 5 Drawing Sheets

(56) References Cited

U.S. PATENT DOCUMENTS

| | | | |
|---|---|---|---|
| 9,436,876 B1* | 9/2016 | Carlson | G06K 9/6224 |
| 9,652,863 B2* | 5/2017 | Bobbitt | G06T 7/254 |
| 9,852,344 B2* | 12/2017 | Dunlop | G06K 9/00718 |
| 9,888,279 B2* | 2/2018 | Ishtiaq | H04N 21/4828 |
| 2002/0164151 A1* | 11/2002 | Jasinschi | G06F 17/30796 |
| | | | 386/241 |
| 2004/0125877 A1* | 7/2004 | Chang | G06F 17/30787 |
| | | | 375/240.28 |
| 2005/0033758 A1* | 2/2005 | Baxter | G06F 17/30038 |
| 2011/0026825 A1* | 2/2011 | Chaudhuri | G06K 9/00751 |
| | | | 382/170 |
| 2011/0081075 A1* | 4/2011 | Adcock | G06K 9/00751 |
| | | | 382/165 |
| 2012/0106925 A1* | 5/2012 | Dirik | H04N 5/147 |
| | | | 386/240 |
| 2014/0245152 A1* | 8/2014 | Carter | G11B 27/28 |
| | | | 715/720 |
| 2015/0127340 A1* | 5/2015 | Epshteyn | G10L 15/26 |
| | | | 704/235 |
| 2015/0279429 A1* | 10/2015 | Laksono | G11B 27/309 |
| | | | 386/241 |
| 2015/0379124 A1* | 12/2015 | Bangalore | G06F 17/30796 |
| | | | 386/241 |
| 2016/0014482 A1* | 1/2016 | Chen | G11B 27/031 |
| | | | 386/241 |
| 2016/0063102 A1* | 3/2016 | Yahav | G06F 17/30781 |
| | | | 382/182 |
| 2017/0063954 A1* | 3/2017 | Biswas | H04L 67/142 |

OTHER PUBLICATIONS

Lenc et al. "A combined SIFT/SURF Descriptor for automatic Face Recognition," in Proc. of the 6th International Conference on Machine Vision (ICMV 2013), 2013.*

Yang et al. "Content Based Lecture Video Retrieval Using Speech and Video Text Information." (2014): 1-1.*

Lindsay Ryan; MOOCs are on the Move: A Snapshot of the Rapid Growth of MOOCs; Jan. 2013.

NPTEL; http://nptel.ac.in/; Oct. 13, 2015.

Philip J. Guo et al.; Demographic Differences in How Students Navigate Through MOOCs; Learning at Scale Conference; 2014.

Juho Kim et al.; Understanding In-Video Dropouts and Interaction Peaks in Online Lecture Videos; Learning at Scale Conference; 2014.

Philip J. Guo et al.; How video production affects student engagement: An empirical study of mooc videos; Proceedings of the first ACM conference on Learning at Scale Conference; 2014.

L. Neumann et al.; Real-Time Scene Text Localization and Recognition; CVPR 2012; Providence, Rhode Island, USA.

A. Krizhevsky et al.; ImageNet Classification with Deep Convolutional Neural Networks; NIPS 2012; Neural Information Processing Systems; Lake Tahoe, Nevada.

* cited by examiner

SYSTEM AND METHODS TO CREATE MULTI-FACETED INDEX INSTRUCTIONAL VIDEOS

BACKGROUND

The present exemplary embodiment relates to indexing systems. It finds particular application in conjunction with video data analysis, and will be described with particular reference thereto. However, it is to be appreciated that the present exemplary embodiments are also amenable to other like applications.

The growth of Massive Open Online Courses (MOOCs) is considered one of the biggest revolutions in education in last 200 years. MOOCs offer free online courses delivered by qualified professors from world-known universities and attended by millions of students remotely. The bulk of the MOOC material is in the form of video content. The growth of MOOCs have been remarkable; Coursera (one of the largest MOOC provider) enrolls nearly 7K participants every day across globe. In India, the National Program of Technology Enhanced Learning (NPTEL) records engineering lectures from tier-1 colleges and make them freely available for tier-2/3/4 engineering college students, where recruiting quality teachers is often not possible due to lack of infrastructure. As the amount of online courses and the demand for them increases in the next few years, it is important to develop methods for efficient access and usage of these video lectures. Developing methods for summarization, navigation, metadata generation and table of content creation for instructional videos are already active areas of research.

Though, MOOCs were perceived as a new frontier in education they currently suffer from high dropout rates. Recent studies have shown that students enrolled on MOOC platforms are very likely to skip course content. This happens due to two main reasons: lack of interest/engagement or prior knowledge of subject matter. It has been observed that certificate earning students skip 22% of the course content. Also, these students were spending only about 4.4 minutes on a 12 to 15 minutes video. Traditionally, navigation in video content is non-linear compared to other instructional resources such as books, where a multi-faceted index or table of content (topics/figures/tables) aids in the navigation process. However educational videos typically do not have these kinds of indexing.

Although modal table of contents for educational videos are known, they do not usually capture any visual information such as figures/tables/equations/graphs/flow-charts (also referred as "anchor points" herein) while indexing. These anchor points are often present in the slides or when the teacher draws them on the board. That makes it extremely difficult for students to search for any of these anchor points in the educational video. For example, if a student is interested in learning about the design of a particular item, for example, a "master-slave flip-flop circuit," she will have to move back and forth multiple times in an hour long video to find the instant where the particular corresponding figure of interest has been shown. This can be highly tedious when a student is under time-pressure. Thus it is important to create a multi-faceted index for videos that enables efficient and quick navigation. Automatic generation of such an index is non-trivial and requires intelligent processing of the video content.

Often anchor points are better displayed at a higher resolution rate for enhanced clarity to the student, but higher resolution requires higher bandwidth so that much of the video (e.g., non anchor points) can be acceptably displayed at a relatively lower resolution for cost and efficiency reasons. There is thus a need to correlate identified anchor points to a resolution rate so that the anchor points can be displayed at a desired higher resolution rate.

There is thus a need for improved systems, including multi-facet indexing of video content which will provide a greater ease to a user desiring to navigate through the video content more efficiently.

BRIEF DESCRIPTION

The subject embodiments relate to methods and systems for identification and localization of anchor points in a video. Features are extracted from the visual and audio modalities of the video content to infer the locations of figures/tables/equations/graphs/flowcharts. These anchor points are highlighted on a video timeline to enable quick navigation and provide a quick summary of the video content. A voice-based mechanism can be used to navigate to points of interest in the video corresponding to selected topic labels. In cases of bandwidth constrained settings, videos are often played at a very low resolution (quality) and often users need to increase video resolution manually to understand content presented in the figures. Using the identification of the aforementioned anchor points, the resolution can be changed dynamically during streaming of video, which will provide a better viewing experience.

DETAILED DESCRIPTION

The proposed embodiments comprise at least three different components i.e. spatial and temporal localization of anchor points (i.e. diagrams, figures, tables, flowcharts, an equation, chart/graphs, code snippets and the like), voice-based video navigation, and anchor point assisted video streaming. The pipeline/block diagram of the proposed system is shown in FIG. 1.

The anchor points are typically portions of the video having an increased interest or special content to the student viewing the video, and thus are preferably accessible to the student in a more convenient and expeditious manner. They can be identified in several ways.

Figure 1:
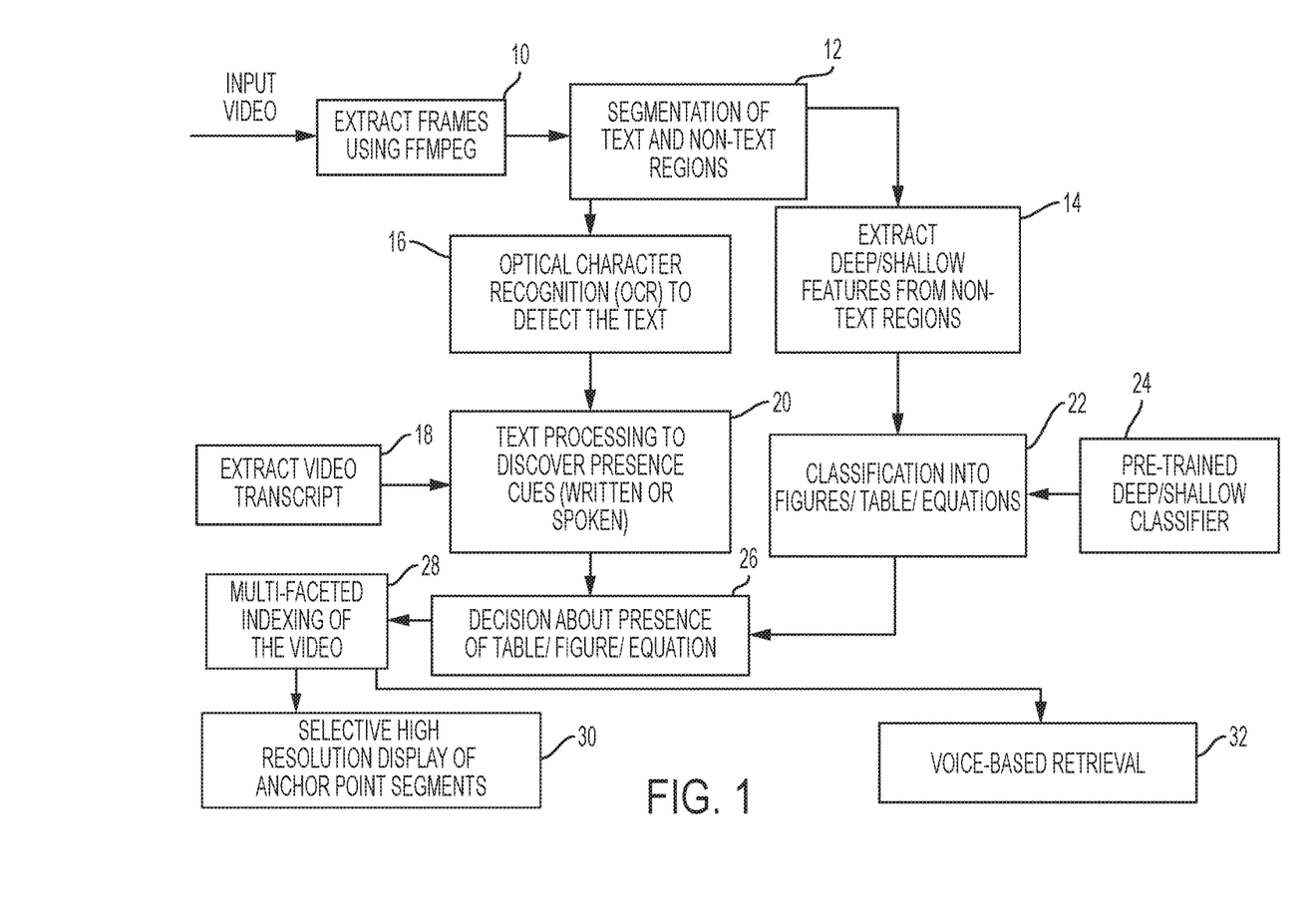
FIG. 1 is a process diagram for localizing anchor points in a video.

In FIG. 1 the identifier blocks may comprise a single or several processors, either hardware or software, for effecting the stated functions. More particularly, an anchor point identifying processor comprises several of the illustrated blocks below.

Frame Extraction:

First, a conversion formatting tool such as "FFmpeg" is used to extract 10 all the frames from an educational video.

Segmentation of Text/Non-Text Regions:

Next, a text localization algorithm is used 12 to segment out the text and non-text regions in each frame. Once this segmentation is performed each of these streams is processed separately 14, 16 along with the speech-to-text transcript (if available) to determine the locations of these anchor points in the video. Deep/shallow features are extracted 14 from the non-text regions.

Optical character recognition ("OCR") is performed 16 on the text regions to determine if there are any indications of presence of any anchor points in this frame or in the frames nearby. Verbal or printed cues are looked for such as "In this figure", "In this table", "look at the table" etc., as typical indicators. Co-reference resolution is also performed on the text to properly connect pronouns or other referring expressions to the right anchors. For example, when the teacher says "look at this" and points towards the figure shown at a slide, it can be automatically determined that he is referring to the figure in that slide, and the figure should be an anchor point.

Speech-to-text transcript processing is similarly performed on the speech-to-text transcript (if available) to determine the presence of similar cues in the text as printed text.

Feature extraction and classification includes determining 22 to which category (figure, equation, graph or table) a non-text region belongs. First, a large dataset of anchor images is collected along with their category labels. Different kinds of features are extracted from the training images and classifiers are built 14, 24 on top of those to automatically figure out the category of an unlabeled image. Machine statistical comparison techniques that are well known are employed to determine the video content category.

Shallow Models:

In this scenario, SIFT (scale invariant feature transform) and SURF (speeded up robust features) are extracted from the training images to create a bag-of-words model on the features. For example, 256 clusters in the bag-of-words model can be used. Then a support vector machine (SVM) classifier is trained using the 256 dimensional bag-of-features from the training data. For each un-labelled image (non-text region) the SIFT/SURF features are extracted and represented using the bag-of-words model created using the training data. The image is then fed into the SVM classifier to find out the category of the video content.

Deep Models:

convolutional neural networks (CNN) are used to classify non-text regions. CNNs have been extremely effective in automatically learning features from images. CNNs process an image through different operations such as convolution, max-pooling etc. to create representations that are analogous to human brains. CNNs have recently been very successful in many computer vision tasks, such as image classification, object detection, segmentation etc. Motivated by that, CNN for classification is used 22 to determine the anchor points. An existing convolution neural network called "Alexnet" is used to fine-tune the training images that are collected to create an end-to-end anchor point classification system. While fine-tuning the weights of the top layers of the CNN are modified while keeping the weights of the lower layers similar to the initial weights.

Decision Making Engine:

Once the classification is completed of the non-text regions into one of these classes and the presence of cues by the processing of the written text and the speech-to-text transcript, they are combined 26 using rule based systems to make the final prediction about the spatial and temporal presence of the anchor points. A multi-faceted index 28 (FIGS. 3, 4A and 4B) is determined and formatted for display from the final productions.

Voice-Based Video Navigation:

The resulting multi-faceted index is enriched with anchor points and helps in navigating to a point of interest in a video. The index is combined with voice-based interfaces is very helpful for differently abled people on mobile devices i.e. individuals with motor impairment (hand tremor), who have difficulty in navigating to a desired point of interest using traditional video timeline. Thus a student can use voice based retrieval or navigation 32 to locate a desired anchor point in the video. For example, user may specific a voice query, "go to flowchart where heap sort concept was discussed", or a textual search query, "heap sort video with a flowchart".

Apart from localization of a figure/table in a given video, the proposed embodiments help in tagging those images with concept-specific information (derived from visual and textual transcript information). For instance, if there is a table located in a video at a given time (say 13:15 minutes) in a given 20 minutes video. A set of labels are assigned to this table using the process described in FIG. 2.

Figure 2:
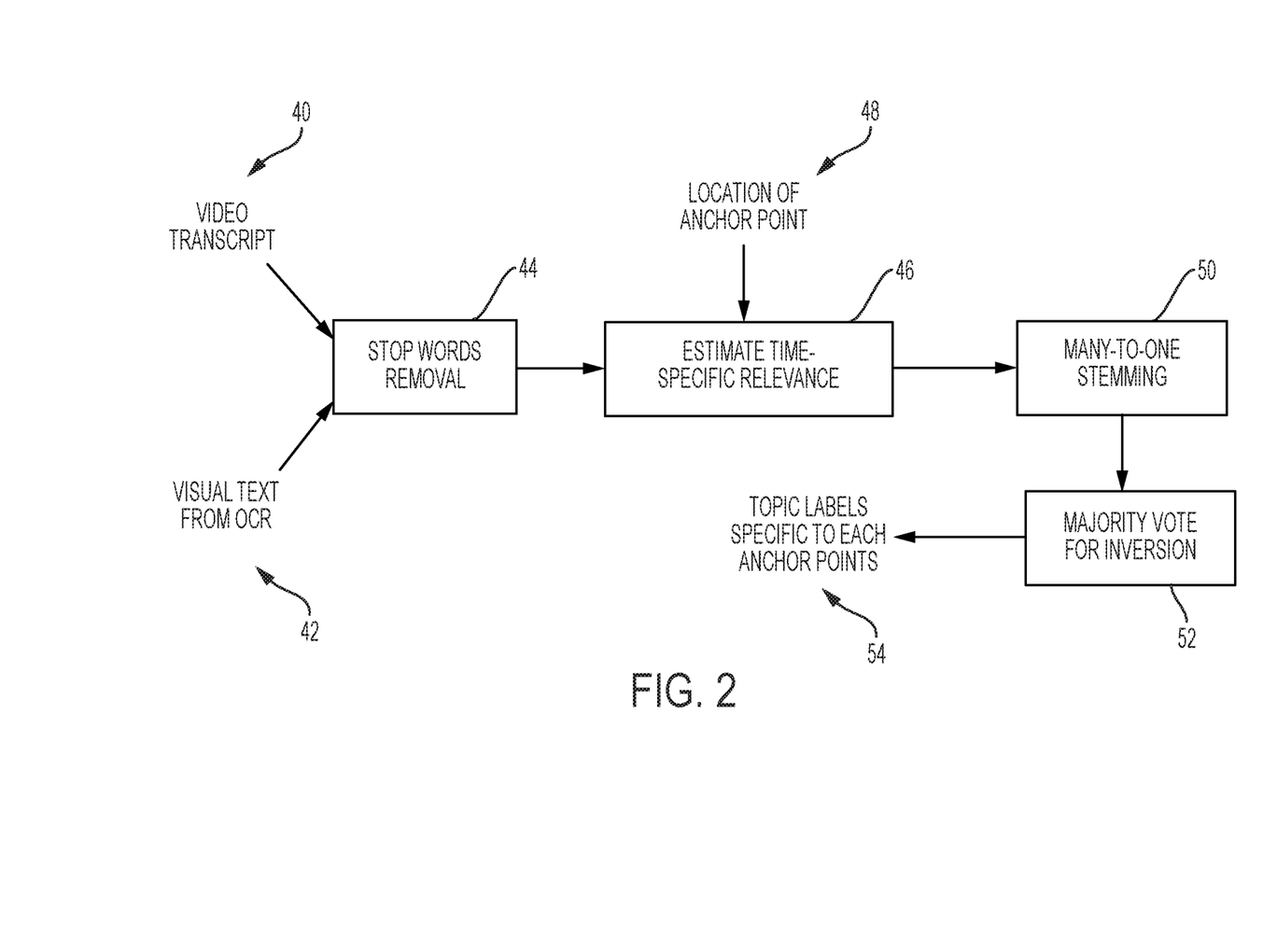
FIG. 2 is a flowchart illustrating a process to assign labels to discovered anchor points.

FIG. 2 shows a step by step process to determine and assign topics or topic labels to the discovered anchor points.

Stop-Words Removal:

The video transcript 40 and any visual text from OCR 42 are processed in "stop words removal" 44 so that all the non-important words such as "A", "An", "The" are filtered. This step filters all the keywords which do not have relevance to core video content (i.e. concepts)

Time-Specific Relevance:

The thus filtered video content is processed in a "estimate time-specific relevance" step 46 to locate 48 the determined anchor points of the video. It finds out the time interval in a video where a particular anchor point has been discussed in the video.

Many to One Stemming:

The keywords identified in a specific time interval as described above are converted into their root form. (i.e. courses to course) 50.

Majority Vote Inversion:

Sometime stemming may lead to unreadable keyword forms and therefore, instead of their root form the most occurring form in a video is selected 52.

After all the above text processing steps, a set of representative keywords form the topic labels of every anchor point in a video is determined 54.

For example, if there is a flowchart discovered in a video, the assigned labels from the above process can describe which associated algorithms (or topic) has been discussed using the flowchart. These labels give extra information to associated anchor points and make voice-based retrieval much easier. Proposed embodiments support exemplary queries such as the following:

"Navigate to the flowchart which discusses heap sort algorithm."

"Open the instance of the video which talks about binary search algorithm."

"Navigate to the table which compares probability to gender employment."

The anchor point responsive to such queries is located and displayed for the student.

Anchor points assisted video rate streaming is included in the embodiments for enhanced clarity of display to the student.

Current adaptive video streaming algorithms remain agnostic to the content of the video and as a result, many times offer poor quality of experience especially in low-bandwidth conditions. These streaming algorithms consider the bandwidth and CPU constraints for the adaptation purposes (i.e. segment size, duration, etc). The proposed embodiments provide methods to automatically localize salient portions of the video (in terms of anchor points), which can be used as one of the constraints for the adaptation purposes. For example, one optimization which can be performed is for the segments that contain one or more anchor points are sent 30 (FIG. 1) with a higher resolution, thus improving quality of user experience.

Figure 3:
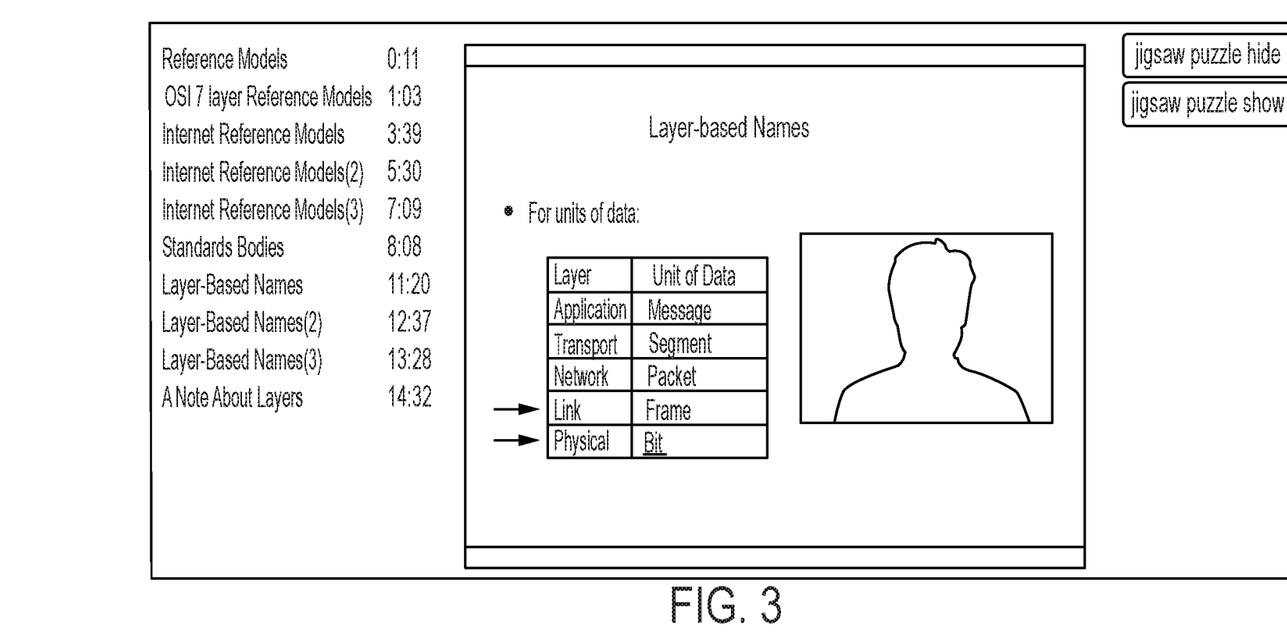
FIG. 3 shows multi-faceted indexing of video content with time location indexing.

With reference to FIG. 3, a selected video entitled "Layer-Based Names" is indexed by a plurality of topics as:

| | |
|---|---|
| Reference Models | 0:11; |
| OSI 7 layer Reference Models | 1:03; |
| Internet Reference Models | 3:39; |
| Internet Reference Models(2) | 5:30; |
| Internet Reference Models(3) | 7:09; |
| Standards Bodies | 8:08; |
| Layer-Based Names | 11:20; |
| Layer-Based Names(2) | 12:37; |
| Layer-Based Names(3) | 13:28; and |
| A Note About Layers | 14:32. |

Figure 4A:
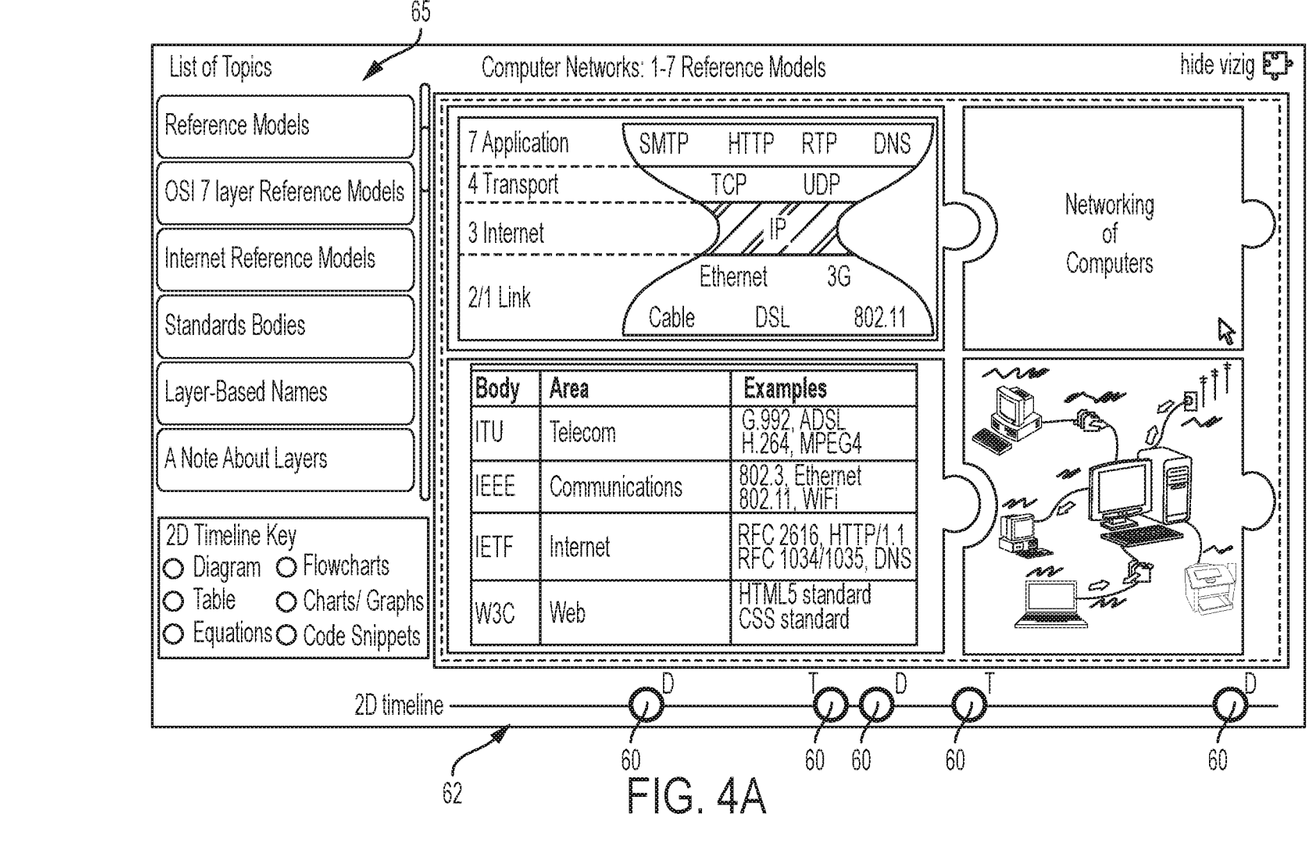
FIGS. 4A and 4B show alternative multi-faceted indexing of anchor points in a video with a 2D timeline.
Figure 4B:
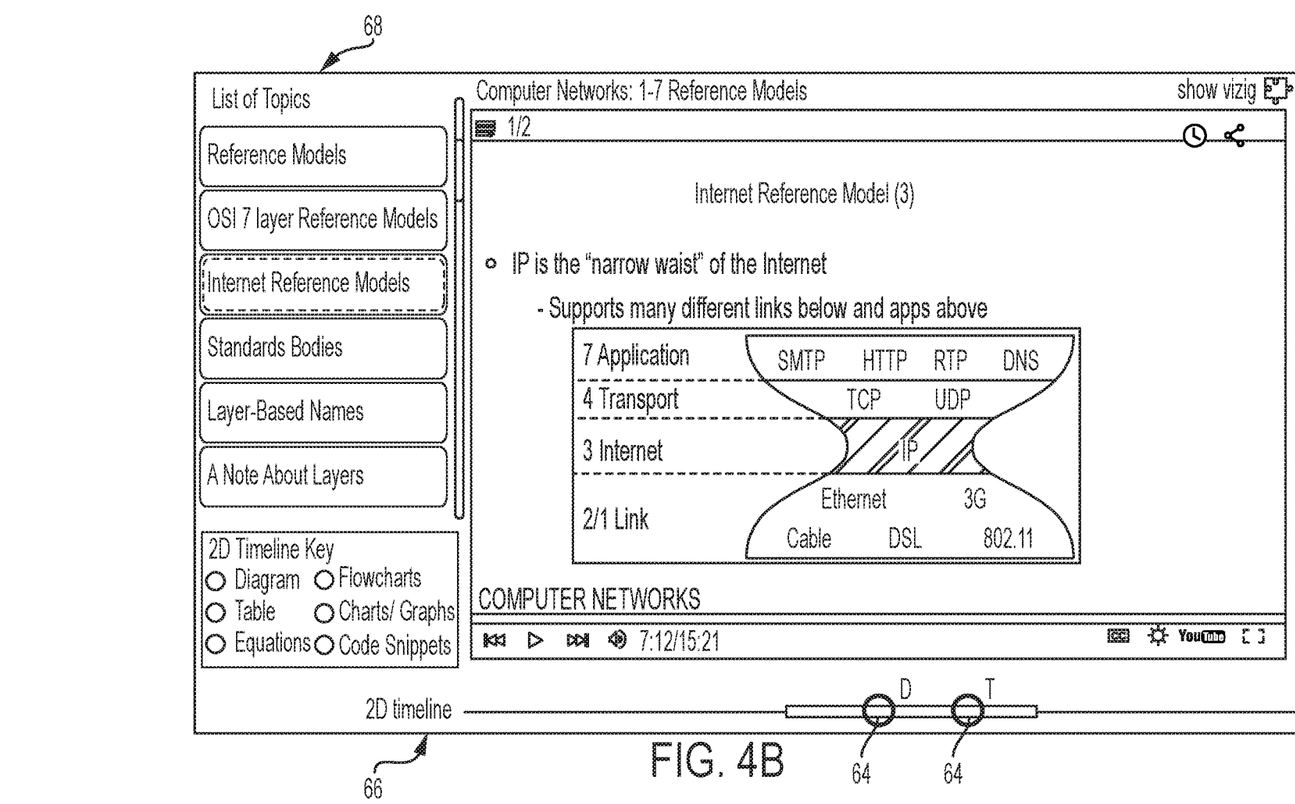

With reference to FIG. 4A, for a video relating to computer network: a 2D timeline that identifies different categories of anchor points 60 is graphically shown. For example, the video contains three diagrams and two tables that may be easily identified by relative position in the content with access to the 2D timeline 62 so that a user can quickly go to the diagrams and tables without having to search through the entire content. A list of relevant topic labels 65 is also shown. FIG. 4B is similar to FIG. 4A in which the video topic of "Internet Reference Models" is shown to include two anchor points 64 via the 2D timeline 66 comprising a single diagram and a single label table. In this example, the diagram is shown at time 7:12 and is displayed to a user. Other topics are available in the list of topics 68.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An indexing system for video content including a plurality of anchor points of selected interest to a user of the video content, comprising:
an anchor point identifying processor configured to identify occurrence of selected ones of the anchor points in a video based on high-level visual elements,
wherein the high-level visual elements are identified and classified in a plurality of categories using multi-modal inputs,
wherein the multi-modal inputs comprise audio and visual data from a video and textual data obtained from the audio and visual data, and
wherein the anchor point identifying processor is further configured to
segment text and non-text regions out from each frame in the video, and
determine one or more location of the anchor points, wherein to determine the one or more locations of the anchor points,
deep and shallow features are extracted from the non-text regions,
determine a category for the non-text regions, wherein the category comprises diagrams, figures, tables, flowcharts, equations, charts and graphs, and code-snippets, and
classify the non-text regions to the category, and
predict a spatial and temporal presence of the anchor points using the classified non-text regions, written text, and speech-to-text transcript of the video;
a label assignation processor configured to assign topic labels to the identified anchor points; and
an index generator configured to form and display in association with the video content a multi-faceted index, comprising a relative representation of position of a selected one of this anchor points within the video content, and a 2-dimensional timeline identifying a plurality of categories of the anchor points, wherein
the label assignation processor is further configured to assign a label or caption to each of the plurality of categories.

2. The system of claim 1, comprising a resolution changer configured to adjust a displayed resolution of a one of the anchor points selected for display by the user via the index.

3. The system of claim 1, wherein the identifying processor comprises a segmentation of text and non-text regions.

4. The system of claim 3, wherein the identifying processor comprises optical character recognition of the text region for the anchor points.

5. The system of claim 3, wherein the identifying processor comprises feature extraction and classification of the non-text region for the anchor points.

6. The system of claim 5, wherein the feature extraction and classification comprises SIFT and SURF extraction.

7. The system of claim 5, wherein the feature extraction and classification comprises conventional neural network classification.

8. The system of claim 1, wherein the index generator comprises a timeline relative presentation of anchor point position in the video content.

9. The system of claim 1, wherein the index generator comprises a topic table.

10. The system of claim 1, including a voice based navigation processor configured to navigate to an identified anchor point.

11. The system of claim 1, wherein the label assignation processor references associated topic discussion to determine the assigned topic.

12. The system of claim 11, wherein the label assignation processor comprises at least one of stop-words removal, time specific relevance, many to one stemming and majority vote inversion.

13. The system of claim 1, further comprising:
an index generator further configured to provide an overlay or interactive summary of anchor points over the video, wherein the anchor points provide a link to relevant section of the video.

14. The system of claim 1, further comprising:
an extraction and classification processor configured to determine which of the plurality of categories a non-text region belongs to, wherein
the extraction and classification processor is further configured to collect a dataset of anchor images along with corresponding category labels, and build classifiers on top of the anchor images to automatically determine a category of an unlabeled image along with one or more multi-modal inputs.

15. A process identifying and displaying one or more anchor points on a timeline within a video, comprising:
    segmenting, by one or more processors, one or more text regions and one or more non-text regions in one or more frames, wherein the one or more frames are extracted from the video;
    determining, by the one or more processors, a location of the one or more anchor points within the one or more frames, wherein the determining of the location of the one or more anchor points comprises
    extracting one or more deep and shallow features from the one or more non-text regions,
    determining one or more categories for the one or more deep and shallow features, and
    classifying the one or more non-text regions into the one or more categories to determine anchor points, wherein the categories comprise diagrams, figures, tables, flowcharts, equations, charts and graphs, and code-snippets;
    combining, by the one or more processors, the classified one or more non-text regions with speech-to-text transcript to predict a spatial and temporal presence of the one or more anchor points; and
    multifaceted indexing, by the one or more processors, of the predicted spatial and temporal presence of the one or more anchor points for display to a user.

16. The process of claim 15, wherein the determining of the category comprises
    collecting a dataset of one or more anchor images and corresponding category labels, and
    using the dataset to build a pre-trained classifier.

17. The process of claim 15, further comprising:
    assigning one or more topic labels to a corresponding one of the one or more anchor points.

18. The process of claim 17, wherein the assigning of the one or more topic labels comprises
    filtering irrelevant one or more words extracted from a video transcript extracted from the video and visual text extracted from the video; and
    identifying one or more locations of the one or more anchor points in video in relation to a particular time within the video.

19. The process of claim 18, wherein the assigning of the one or more topic labels comprises
    converting identified keywords at the particular time in the video into a root form; and
    selecting a most occurring form of the identified keywords in the video.

20. The process of claim 19, wherein the assigning of the one or more topic labels comprises
    forming topic labels for the identified keywords in the video for each of the one or more anchor points.

* * * * *